US006583532B2

(12) United States Patent
Hein et al.

(10) Patent No.: US 6,583,532 B2
(45) Date of Patent: Jun. 24, 2003

(54) ROTATING ELECTRICAL MACHINE HAVING A PERMANENT-MAGNET ROTOR

(75) Inventors: Peter Hein, Ruethnick (DE); Juergen Huber, Erlangen (DE); Juergen Lange, Berlin (DE); Christian Meyer, Berlin (DE); Wolfgang Rogler, Moehrendorf (DE); Ingo Schuering, Schoenwalde (DE)

(73) Assignee: Siemens Aktiengesellschaft (DE)

(*) Notice: Subject to any disclaimer, the term of this patent is extended or adjusted under 35 U.S.C. 154(b) by 17 days.

(21) Appl. No.: 09/908,254

(22) Filed: Jul. 18, 2001

(65) Prior Publication Data

US 2002/0027396 A1 Mar. 7, 2002

Related U.S. Application Data

(63) Continuation of application No. PCT/DE00/00180, filed on Jan. 19, 2000.

(30) Foreign Application Priority Data

Jan. 20, 1999 (DE) .......................... 199 02 837

(51) Int. Cl.$^7$ .............................. H02K 9/00; H02K 1/04
(52) U.S. Cl. ........................ 310/260; 310/43; 310/45; 310/64
(58) Field of Search ................. 310/260, 270, 310/258, 43, 44, 45, 64, 65

(56) References Cited

U.S. PATENT DOCUMENTS

| | | | | |
|---|---|---|---|---|
| 3,508,092 A | | 4/1970 | Hallidy | 310/64 |
| 3,688,137 A | * | 8/1972 | Filhol | 310/43 |
| 3,975,655 A | | 8/1976 | Beermann et al. | 310/260 |
| 4,054,809 A | | 10/1977 | Jefferies | 310/256 |
| 4,356,417 A | * | 10/1982 | Smith et al. | 156/185 |
| 4,963,776 A | * | 10/1990 | Kitamura | 310/258 |
| 6,069,431 A | * | 5/2000 | Satoh et al. | 310/256 |
| 6,157,109 A | * | 12/2000 | Schiferl et al. | 310/216 |
| 6,201,321 B1 | * | 3/2001 | Mosciatti et al. | 310/43 |
| 6,445,095 B1 | * | 9/2002 | Liang et al. | 310/64 |

FOREIGN PATENT DOCUMENTS

| | | |
|---|---|---|
| AT | 151584 | 11/1937 |
| DE | 1204316 | 10/1961 |
| DE | 3808190 | 11/1988 |
| DE | 4213132 | 11/1992 |
| DE | 69203988 | 11/1995 |
| EP | 0523353 | 1/1993 |
| FR | 1364058 | 5/1963 |
| FR | 1571890 | 5/1969 |
| FR | 2297510 | 1/1975 |
| WO | 9749605 | 12/1997 |
| WO | 9905023 | 2/1999 |

OTHER PUBLICATIONS

"Permasyn®—Ein permanenterregter Synchronmotor für den Schiffsbetrieb", pp.221–227, 1987.

* cited by examiner

Primary Examiner—Dang Dinh Le
(74) Attorney, Agent, or Firm—Baker Botts LLP

(57) ABSTRACT

In a rotating electrical machine having a permanent-magnet rotor, the tubular, highly thermally conductive supporting body of the stator forms a thermal bridge to a cooling means. In order to allow the end windings of the stator windings to be cooled effectively as well, the end windings also each have an associated thermal bridge, which completely fills the space between the end windings and the supporting body of the stator. This thermal bridge is of solid construction having a solid ring, which is connected to the supporting body of the stator with a force fit, and a cast-resin body which is cast into this solid ring. The cast-resin body has a thermal conductivity of more than 1.6 W/mK and, for this purpose, contains a powdery, highly thermally conductive filler making up a proportion of 50 to 90% by weight, preferably an aluminum nitride coated with silicon dioxide.

12 Claims, 2 Drawing Sheets

ROTATING ELECTRICAL MACHINE HAVING A PERMANENT-MAGNET ROTOR

This is a continuation of copending application Ser. No. PCT/DE00/00 180 filed Jan. 19, 2000, PCT Publication WO 00/44080, which claims the priority of DE 199 02 837.0 filed Jan. 20, 1999.

FIELD OF THE INVENTION

The present invention relates to the field of rotating electrical machines and is applicable to the configuration of high-power motors or generators having a permanent-magnet rotor, and in which special measures for dissipation of the heat to the supporting body of the stator are provided for the end windings of the stator winding. Such motors can be used as propulsion motors for ships; as generators, they can be used, for example, in wind power systems.

BACKGROUND OF THE INVENTION

A known synchronous motor of the type described above is generally arranged in a gondola-like housing on the underneath of the hull of a ship. The stator is clamped into the housing with a positive lock or a force fit, thus ensuring that the stator, and hence the stator winding, are cooled by the surrounding sea water. The end windings of the stator winding may have additional cooling devices in the form of a fan or a spraying device as disclosed in WO 97/49 605 A. Furthermore, it has been proposed as disclosed in WO 99/05 023 A for heat dissipation bridges composed of a plastic such as an epoxy resin to be used for the end windings of the synchronous motor, and which contains minerals as a thermally conductive filler.

The use of a synchronous motor with a permanent-magnet rotor is also known for a motor which is used to drive control rods in the pressure vessel of a reactor container, with a thermal bridge to the stator housing being provided for the end windings of the rotor. The thermal bridge is composed of a porous mineral filling, which fills the end winding areas. See: EP 0 523 353 A1/DE 692 03 988 T2.

When permanent-magnet synchronous motors are used in the operation of a ship and said motors are arranged within the hull of the ship, it is normal for the stator winding to be cooled by using a yoke ring as the stator, as the supporting body for the stator winding, in which channels through which fresh water flows are located. Cooling vanes arranged at the ends of the yoke ring ensure good cooling of the end windings (Jahrbuch der schiffbautechnischen Gesellschaft [Yearbook of the Ship Construction Association] 81 (1987), pages 221/222). It is also known in the case of permanent-magnet synchronous motors used in vehicles and various propulsion purposes, for the wall of the housing surrounding the stator to be provided with cooling channels. See: DE 42 13 132 A1, FR 1 571 890 A.

It is also known for electrical machines to be designed such that the rotor surrounds the stator. In "external rotor" machines, the stator is mounted on a tubular supporting body which, if necessary, can also be provided with cooling channels. See: DE 12 03 373 B and other documents in IPC H02K 1/06.

For cooling the end windings of an electrical machine in which the rotor revolves in a medium at high temperature and where the stator is closed off from the rotor by means of a split tube, it is known for annular heat conductors composed of cast copper to be arranged between the end windings and the cooled housing casing. The heat conductors have finger-like, flexible projections, which surround the end windings on the end faces with a short gap and extend into the vicinity of the air gap. The end windings are also surrounded by an embedding compound which is composed of an electrically insulating material having good thermal conductivity, such as an insoluble silicone resin with a filler composed of finely distributed powdery clay. See: DE 12 04 316 B 1.

Also knows are electrical machines in which the stator end windings have associated aluminum rings for heat dissipation purposes and in which the gap between the end windings and a ring is bridged by a thermally conductive filler layer, for example an epoxy resin. See: AT 151 584 A, U.S. Pat. No. 3 508 092 A. —Furthermore, an epoxy resin which, with the addition of a ceramic filler, has a thermal conductivity of 0.26 cal/m*sec*° C. is known to be used for impregnation of the stator winding of an electric motor. See: DE 38 08 190 A1.

SUMMARY OF THE INVENTION

In the context of a rotating electrical machine having s synchronous motor with a permanent-magnet rotor with a thermal bridge for the strator housing being provided for the end of the wingdings of the rotor, the present invention is based on the object of providing the thermal bridge with a thermal conductivity that is as high as possible. To achieve this object, the present invention provides for the thermal bridges associated with the end windings to be of solid construction and each to comprise a highly thermally conductive solid ring composed of metal, and a cast-resin body, which is cast into the solid ring and which contains a highly thermally conductive filler or a filler mixture. The solid ring is formed from a large number of axially stacked annular disks, which are matched to the external contour of the end windings and which are connected with a force fit to the supporting body of the stator. The end windings are embedded in the cast-resin body which has a thermal conductivity of more than 1.6 W/mK due to the use of a filler or a filler mixture making up a proportion of 50 to 90% by weight.

The design of the thermal bridge according to the present invention thus provides firstly for the area between the end windings and the supporting body of the stator to be essentially bridged by a solid ring, which is expediently composed of a metal such as aluminum or copper, rests closely on the supporting body of the stator and has a relatively short, defined gap between it and the end windings and, secondly for the end windings to be embedded in a thermally conductive cast-resin body which, for its part, rests closely on the solid ring. Since there are no layers of air in the radial direction between the end windings and the cooled supporting body which could adversely affect the heat dissipation, this ensures optimum heat transfer from the end windings to the cooled supporting body of the stator. Splitting the solid ring into individual laminates serves to reduce the eddy current losses. Such lamination also allows the contour of the solid ring to be finely matched to the external contour of the end windings, by the internal diameter of the laminates being finely stepped. The arrangement and design of the solid ring ensure that, by virtue of the cooled supporting body of the stator, the temperature remains relatively low up to a point close to the near end winding.

A thermal class F (long-term temperature resistance 155° C.) cast-resin system can be provided for the cast-resin body of the thermal bridge which, apart from high thermal conductivity has a good response to temperature changes, high mechanical strength, and a low thermal coefficient of expansion. Adhesion on the boundary surfaces between the cast-resin body and the solid ring should also be ensured. Possible cast resins include, in particular, those based on polyester, ester imide, silicone, polyurethane and epoxy. Epoxy-based resins, in particular acid-anhydride curable resins, have been found to be particularly suitable, owing to their balanced characteristic profile. In addition to aromatic epoxy resins of bisphenol A and/or bisphenol F, it is also possible to use, in particular, resins which have the following composition:

a) an aromatic and/or heterocyclic polyepoxy resin, possibly mixed with an aliphatic epoxy resin;

b) an anhydride and/or an anhydride mixture, in particular a carboxylic acid anhydride and/or a carboxylic acid anhydride mixture, possibly mixed with an acid ester composed of an anhydride; and c) an accelerator such as an amine accelerator, with components (a) and (b) normally being used stoichiometrically in a ratio of 1:1, or with slightly less of the component (b).

A cast-resin body produced using such resins which are known per se and are commercially available may contain rigid and/or flexible fabric insert components, in order to influence the mechanical characteristics. The essential feature is, however, that the cast-resin to be processed contains a filler which serves to increase the thermal conductivity and, possibly, to reduce the thermal coefficient of expansion of the cast-resin body and to increase the resistance to temperature changes. Inorganic fillers having high intrinsic thermal conductivity, such as aluminum oxide, aluminum nitride, in particular coated aluminum nitride, silicon carbide and metal powders in particular such as aluminum powder together with finely ground quartz and synthetic silica flour, as well as mixtures of these materials, are particularly suitable for this purpose. The respectively chosen filler combination should make up a proportion of between 50 and a maximum of 90% by weight, and preferably 60 to 90% by weight, in the cast-resin body. If the filler combination contains finely ground quartz or synthetic silica flour, its proportion should be at most 10% by weight.

Said fillers or filler combinations can be incorporated relatively well in the resins mentioned above, since these resins have relatively low viscosity. At a processing temperature of about 60 to 90° C., and preferably at 75 to 85° C., those resins based on polyepoxy, in particular, have good application at temperatures from 70 to 100° C., and preferably at 80 to 90° C., both at normal pressure and in a vacuum, or in a vacuum with pressure subsequently being applied.

A thermal bridge designed according to the present invention has a thermal conductivity of more than 1.6 W/mK in the region of the cast-resin body, and even more than 2.0 W/mK if the proportion of filler is very high. The thermal bridge designed according to the present invention is sufficiently mechanically robust that there is no need for the end winding reinforcement otherwise required. If the cast-resin body is enriched with an electrically insulating filler, it is also possible to dispense with the main insulation otherwise required on the end winding side, if the windings are designed appropriately.

Thermal bridges designed according to the present invention are used in particular in rotating electrical machines in which the supporting body is a housing surrounding the stator, as for example in a ship's propulsion system, which can be arranged like a gondola, or in the case of propulsion motors, arranged within the hull of the ship. The novel thermal bridge can, however, also be used for rotating electrical machines in which the supporting body is arranged in the interior of a stator surrounded by the rotor. One possible field of application in this case is for generators for wind-power systems.

BRIEF DESCRIPTION OF THE DRAWINGS

The present inventor is further described in conjunction with the drawings in which.

DETAILED DESCRIPTION OF THE INVENTION

Figure 1:
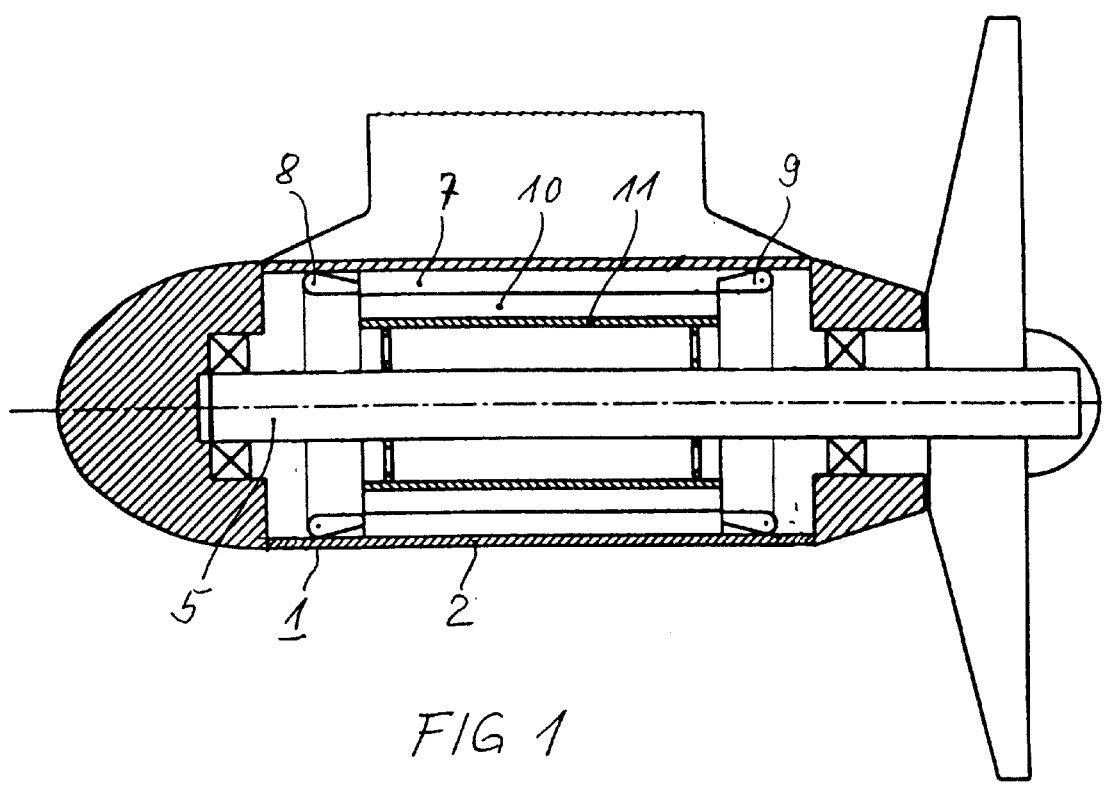
FIG. 1 schematically illustrates a propulsion motor.
Figure 2:
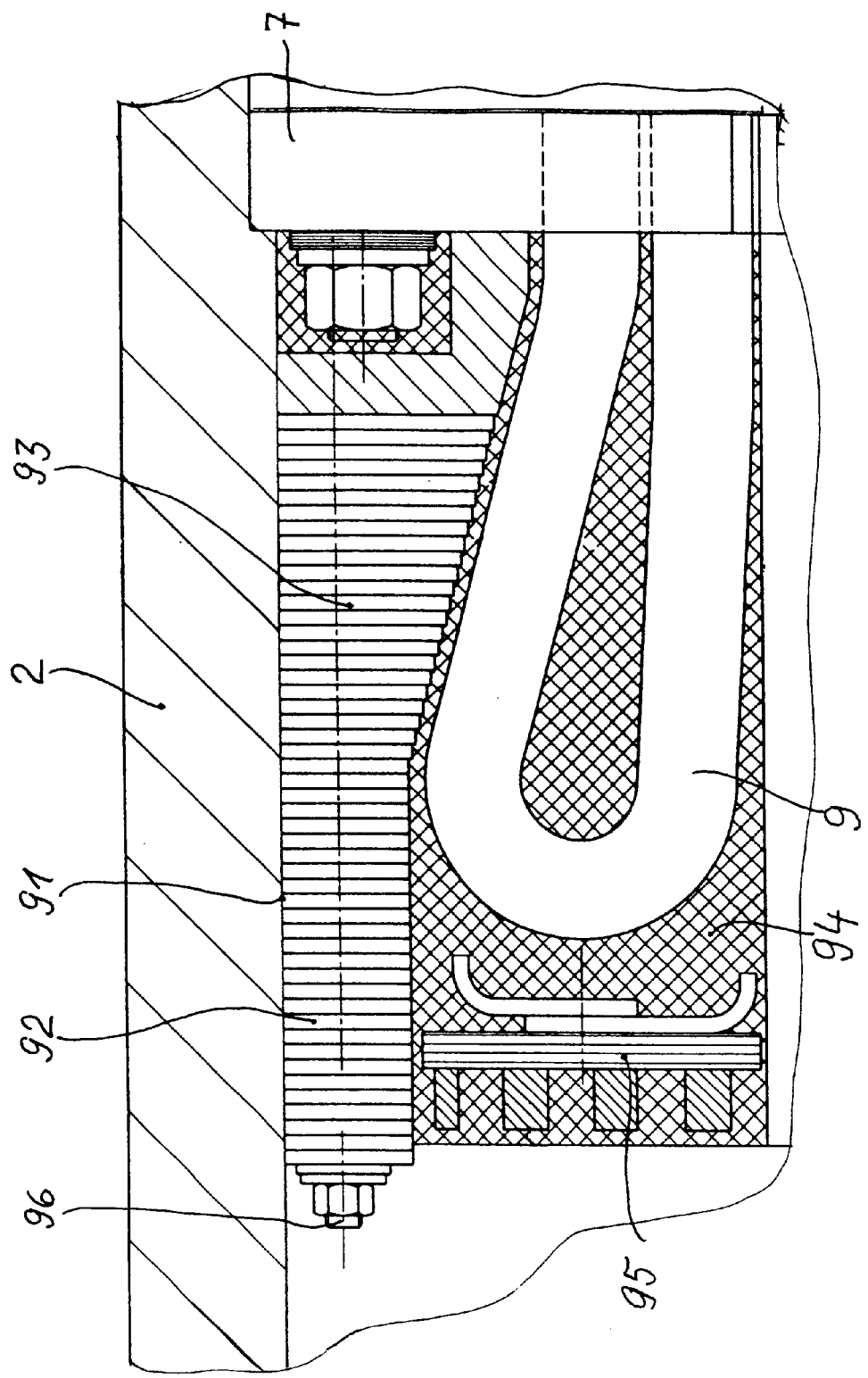
FIG. 2 illustrates an exemplary embodiment of the new thermal bridge. An exemplary embodiment of a cast-resin compound used for the thermal bridge is described below.

The thermal bridge illustrated in FIG. 2 can be used for a propulsion motor as shown in FIG. 1. Based on FIG. 1 in WO 97/49605, the present FIG. 1 shows a gondola-like propulsion device for a ship, in which a synchronous motor comprising a stator 7 and rotor 10 is arranged in a housing 1. The stator 7 of the synchronous motor is fitted with a positive lock into a hollow-cylindrical housing part 2, preferably with this housing part being shrunk onto the laminated stator core. This housing part forms the tubular supporting body of the stator and is composed of a highly thermally conductive material such as a bronze alloy. The windings of the stator can be seen in the end windings 8 and 9. The rotor 10 of the synchronous motor is in the form of a permanent-magnet rotor and has a supporting structure 11 that allows it to rest on the propulsion shaft 5.

As illustrated in FIG. 2, the end windings 8 and 9 on each of the two ends each have an associated thermal bridge, which comprises a solid ring 91 surrounding the respective end windings, and a cast-resin body 94 cast therein. This thermal bridge completely fills the space between the end windings 8 and 9 and the supporting body 2, with the end windings being embedded in the cast-resin body 94. Ring lines 95 for electrical connection of the stator windings, together with attachment elements such as lashing plates, are embedded in the cast-resin body.

The solid ring 91 is composed of individual thin laminates in the form of annular disks which are split into segments, and of which the annular disks 92 arranged in the left-hand part have the same internal diameter, while the annular disks 93 arranged along the falling contour of the end windings 9 have an internal diameter that becomes smaller. The solid ring is thus matched to the contour of the end windings 9 in such a way that a relatively short gap of about 5 mm remains between the solid ring 91 and the end windings 9.

The solid ring 91 is attached to the stator 7 at the end by means of axially running attachment bolts 96, in such a manner that, when the tubular housing part 2 is shrunk onto the stator 7, it is also shrunk onto the solid ring 91. In preparation for this, the solid ring, like the stator, has already been machined to the required size (external diameter) by means of turning tools.

In order to produce the cast-resin body 91, a hollow-cylindrical or pot-like body is arranged inside the end windings and is used as an inner mold for the cast-resin body 94. The cast-resin body 94 is then produced by pouring in and subsequently curing an appropriate cast-resin compound, with the stator arranged vertically.

A preferred cast resin which is suitable for the illustrated application has the following composition:

a) 92 parts by weight of an epoxy resin;

b) 75 parts by weight of a carboxylic acid anhydride;

c) 0.8 parts by weight of an amine accelerator;

d) 550 parts by weight of an aluminum nitride coated with silicon dioxide; and e) 29 parts by weight of a synthetic silica flour.

In order to produce a cast-resin body, said components are first mixed at a temperature of about 80° C. and are then degasified, until they are free of bubbles, at about the same temperature and at a pressure of 1 to 10 mbar. The cast-resin compound is then cast at a temperature of about 80° C., after which it is cured. The curing process takes place, for example, for 12 hours at about 80° C., followed by 4 hours at about 90° C., then 3 hours at about 100° C. and, finally, 12 hours at about 110° C. A cast-resin body produced in this way has a thermal conductivity of 1.9 W/mK.

We claim:

1. A rotating electrical machine comprising a permanent-magnet rotor and a stator having windings including end windings, and associated tubular, thermally conductive supporting body for the stator, wherein the supporting body forms a thermal bridge to a cooling means, and the end windings each have an associated thermal bridge between the end windings and the supporting body which are of solid construction and comprise a thermally conductive solid ring matched to the end windings outer contour, and connected to the supporting body of the stator, said ring comprising metal and cast-resin body which is cast into the solid ring with end windings therein embedded, and which has a thermal conductivity of at least about 1.6 W/Mk.

2. A rotating electrical machine according to claim 1, wherein the stator supporting body and the thermally conductive solid ring are connected by a force fit.

3. A rotating electrical machine according to claim 1, wherein the thermally conductive solid ring is formed from a plurality of axially stacked annular disks and the cast-resin body contains at least one thermally conductive filler component.

4. A rotating electrical machine according to claim 3, wherein the at least one filler component is between about 50% and 90% by weight of the cast-resin body.

5. A rotating electrical machine according to claim 4, wherein the filler component is a mixture of suitable filler component.

6. A rotating electrical machine according to claim 5, wherein the filler component is selected from the group consisting of coated aluminum nitride, a metal powder, and finely ground quartz.

7. A rotating electrical machine according to claim 6, wherein the metal powder is aluminum powder, and the quartz is present in an amount of up to about 10% by weight of the cast-resin body.

8. The rotating electrical machine according to claim 1, wherein the cast-resin body comprises fabric inserts.

9. The rotating electrical machine according to claim 1, wherein the cast-resin body comprises an epoxy resin, an anhydride and an accelerator.

10. The rotating electrical machine according to claim 9, wherein the epoxy resin is selected from the group consisting of the members of an aromatic and heterocyclic polyepoxy resin, mixture thereof and said members being mixed with an alphalic epoxy resin; the anhydride being selected from the group consisting of the members, an anhydride or anhydride mixtures, and said members which are mixed with an acid ester comprising an anhydride.

11. The rotating electrical machine according to claim 1, wherein the supporting body is a housing surrounding the stator.

12. The rotating electrical machine according to claim 11, wherein the housing is part of a ship propulsion system which can be arranged like a gondola.

* * * * *